United States Patent [19]

Nishizawa et al.

[11] 4,427,822

[45] Jan. 24, 1984

[54] PROCESS FOR PRODUCING PARTICULATE POLYMER HAVING IMIDE GROUPS

[75] Inventors: Hiroshi Nishizawa, Kitaibaraki; Yoshiyuki Mukoyama; Osamu Hirai, both of Hitachi, all of Japan

[73] Assignee: Hitachi Chemical Co., Ltd., Tokyo, Japan

[21] Appl. No.: 440,570

[22] Filed: Nov. 10, 1982

[30] Foreign Application Priority Data

Feb. 15, 1982 [JP] Japan .................................. 57-23271
Mar. 11, 1982 [JP] Japan .................................. 57-39115

[51] Int. Cl.$^3$ ............................................. C08G 18/00
[52] U.S. Cl. .................................... 524/726; 525/186; 528/49; 528/73
[58] Field of Search ..................... 524/726; 525/186; 528/49, 73

[56] References Cited

U.S. PATENT DOCUMENTS 3,518,230  6/1970  Sheffer et al. .......................... 528/73
3,787,367  1/1974  Farrissey et al. ....................... 528/73
3,853,813  10/1974  Edelman et al. ....................... 528/73

*Primary Examiner*—Maurice J. Welsh
*Attorney, Agent, or Firm*—Antonelli, Terry & Wands

[57] ABSTRACT

A particulate polymer which has imide groups and may be in gelled state can be produced by reacting a polyisocyanate with a polycarboxylic acid having at least one acid anhydride group, and if necessary together with a polycarboxylic acid other than that mentioned above in the presence of a liquid medium containing at least one non-aqueous organic liquid, and thereby obtaining the particulate polymer having imide groups dispersed in the non-aqueous organic liquid.

15 Claims, No Drawings

A_427,822

PROCESS FOR PRODUCING PARTICULATE POLYMER HAVING IMIDE GROUPS

BACKGROUND OF THE INVENTION

This invention relates to a process for producing a particulate polymer having imide groups, and more particularly to a process for producing a particulate polymer having imide groups which is excellent in heat resistance and usable mainly as sheet, molded article, adhesive, coating material, composite material and the like.

There is known a technique for producing a solution of polymer having imide groups, such as polyamide-imide solution, polyimide solution and the like, by reacting a polyisocyanate with a polycarboxylic acid having acid anhydride group in the state of a solution in expensive solvent such as N-methylpyrrolidone, dimethylformamide, dimethylacetamide or the like. However, in order to obtain a solid polymer from such a polymer solution, the solvent must be removed or recovered by a quite ineconomical process, so that production of polymer by such a process has an important problem in point of cost if it is practised on an industrial scale. One of the useful processes for producing solid polymers is bulk polymerization process necessitating no use of solvent. However, polymers having imide groups generally have a rigid and highly polar molecular structure and are characterized by having a high glass transition temperature. Accordingly, in applying bulk polymerization process to their production, the reaction must be carried out under serious conditions such as high temperatures and high pressures, which makes it difficult to control the reaction and to suppress side reactions. Thus, no successful result has ever been reported in its practical application.

SUMMARY OF THE INVENTION

The present inventors conducted repeated studies on an inexpensive process for producing an imide group-containing particulate polymer excellent in heat resistance. As a result, a process for producing a particulate polymer having imide groups dispersed in a non-aqueous organic liquid was accomplished.

This invention provides a process for producing a particulate polymer which may be in gelled state and has imide group comprising reacting (I) a polyisocyanate, (II) a polycarboxylic acid having at least one acid anhydride group, and if necessary (III) a polycarboxylic acid other than the above-mentioned (II) in the presence of a liquid medium containing at least one non-aqueous organic liquid (A), and thereby obtaining the particulate polymer having imide groups dispersed in the non-aqueous organic liquid (A).

DESCRIPTION OF PREFERRED EMBODIMENTS

The particulate polymer which may be in gelled state and has imide groups can be produced in various ways by changing the composition of the liquid medium variously.

According to this invention, the following three processes are provided.

First, this invention provides a process for producing a particulate polymer having imide groups which comprises reacting (I) a polyisocyanate, (II) a polycarboxylic acid having at least one acid anhydride group and optionally (III) a polycarboxylic acid other than the above-mentioned (II) in the presence of a non-aqueous organic liquid (A) in which the resulting particulate polymer having imide groups is substantially insoluble, and thereby obtaining a particulate polymer having imide groups dispersed in the non-aqueous organic liquid (A).

According to this production process of this first invention, the particulate polymer having imide groups is obtained in the form of a dispersion of relatively small particles in the non-aqueous organic liquid, so that it can easily be recovered from the dispersion by a procedure of filtration. Further, unlike a solution polymerization process using expensive solvent such as N-methylpyrrolidone, the production process of this invention enables to use an inexpensive general-purpose solvent in which the particulate polymer having imide groups is substantially insoluble, as the non-aqueous organic liquid. Unlike the solution polymerization process where the content of solid component is restricted by the insolubility of polymer having imide groups in solvent, the process of this invention enables to obtain so high a solid content in non-aqueous organic liquid as 50% by weight or more.

In this invention, the conversion from the reactants (a polyisocyanate, a polycarboxylic acid having at least one acid anhydride group and optionally used other carboxylic acid, hereinafter meaning the same) to the particulate polymer can sufficiently be enhanced in the reaction temperature range of usual solution polymerization process, and the reaction can be completed under relatively mild conditions, so that the drop in purity caused by side reactions and the like can be prevented. In addition, this invention is outstandingly different from the solution polymerization process in that it has a characteristic feature that a three-dimensional (gelled) particulate polymer substantially insoluble in solvent can directly be obtained. Such a gel particle can be used as an adsorbent for inorganic elements or as a separating material for organic compounds.

As the non-aqueous organic liquid used in this invention, non-aqueous organic liquids in which the particulate polymer having imide groups is substantially insoluble and which are inert (not inhibitory) to the polymerization reaction are used. As used herein, the term "substantially insoluble" means that the non-aqueous organic liquid includes not only those non-aqueous organic liquids in which the particulate polymer having imide groups is perfectly insoluble but also those in which the particulate polymer having imide groups is not perfectly insoluble but has a very low solubility. Such non-aqueous organic liquids in which the polymer having imide groups has a very low solubility swell the particulate polymer having imide groups in the course of polymerization, as a result of which they accelerate the polymerization reaction rather than the non-aqueous organic liquids in which the polymer having imide groups is perfectly insoluble, and form a particulate polymer having a high degree of polymerization. The non-aqueous organic liquids in which the particulate polymer having imide groups is perfectly insoluble and the non-aqueous organic liquids in which the particulate polymer has a very low solubility and is swellable may be used either alone or in the form of their mixture.

As examples of non-aqueous organic liquid in which the particulate polymer having imide groups formed in this invention is substantially insoluble, there can be used ketones such as acetone, methyl isobutyl ketone, cyclohexanone and the like; esters such as ethyl acetate, butyl acetate and the like; Cellosolves such as methyl Cellosolve acetate, ethyl Cellosolve acetate and the like; ethers such as tetrahydrofuran, dioxane and the like; aliphatic and alicyclic hydrocarbons such as n-hexane, octane, dodecane, ISOPAR-E, ISOPAR-H, ISOPAR-K (trade names of petroleum type saturated aliphatic and alicyclic hydrocarbons having boiling points ranging from about 40° to 300° C., manufactured by Esso Standard Oil Co.) and the like; aromatic hydrocarbons such as benzene, toluene, xylenes, NISSEKI HISOL-100, NISSEKI HISOL-150 (trade names of petroleum type aromatic hydrocarbons having boiling points ranging from about 80° to 300° C., manufactured by Nippon Sekiyu Kagaku K. K.) and the like; acetonitrile; γ-butyrolactone; ethylene carbonate, propylene carbonate; and the like. Among these liquids, those having a boiling point of 80° C. or higher are preferable from the viewpoint of reaction temperature. Further, those which can solubilize the reactants are preferable for suppressing the side reactions and proceeding the reaction at a relatively low temperature. Further, the non-aqueous organic liquid may be used in a partial combination with a non-aqueous organic liquid in which the particulate polymer having imide groups is soluble, such as N-methylpyrrolidone, dimethylformamide, dimethylacetamide, phenol, cresol and the like. Such a liquid can be used in such an amount that it causes swelling of the particulate polymer and does not cause agglomeration nor solution of the particulate polymer dispersed in the non-aqueous organic liquid. Preferably, this non-aqueous organic liquid in which the particulate polymer having imide groups is soluble has a poor affinity to the non-aqueous organic liquid in which the particulate polymer having imide groups is substantially insoluble. If it is so, the non-aqueous organic liquid in which the particulate polymer having imide group is soluble is effectively distributed into the dispersion phase of particulate polymer, as the result of which it accelerates the polymerization reaction to yield a particulate polymer of high degree of polymerization.

Examples of the polyisocyanate usable in this invention include aromatic diisocyanates such as tolylene diisocyanate, xylylene diisocyanate, 4,4'-diphenylether diisocyanate, naphthylene-1,5-diisocyanate, 4,4'-diphenylmethane diisocyanate and the like, aliphatic diisocyanates such as ethylene diisocyanate, 1,4-tetramethylene diisocyanate, 1,6-hexamethylene diisocyanate, 1,12-dodecane diisocyanate and the like; alicyclic diisocyanates such as cyclobutene-1,3-diisocyanate, cyclohexane-1,3- and 1,4-diisocyanates, isophorone diisocyanate and the like; polyisocyanates such as triphenylmethane-4,4',4"-triisocyanate, a polyphenylmethyl polyisocyanate, e.g. phosgenated product of aniline-formaldehyde condensate or the like; and isocyanurate ring-containing polyisocyanates produced by trimerizing these polyisocyanates. From the viewpoint of heat resistance, it is preferable to use, among these polyisocyanates, aromatic diisocyanates such as tolylene diisocyanate, 4,4'-diphenylmethane diisocyanate and the like and isocyanurate ring-containing polyisocyanates obtainable by the trimerization reaction of these aromatic diisocyanates. The process for producing preferable isocyanurate ring-containing polyisocyanates is mentioned in Japanese Patent Application No. 148,820/78. Said isocyanurate ring-containing polyisocyanates are used as branching component, and their isocyanurate ring skeleton gives excellent heat resistance. For synthesizing a particulate polymer having imide groups which is substantially linear and thermoplastic, bifunctional polyisocyanates are used. For synthesizing a particulate polymer having imide groups which is branched and thermosetting, and for synthesizing a particulate polymer having imide groups which has a three-dimensional network structure and is insoluble in a solvent (gel particle), 3- or higher-functional polyisocyanates are used. These polyisocyanates are used either alone or as a mixture thereof, depending on purposes. In order to control reaction rate in the course of polycondensation reaction and to obtain a stable particle, it is also possible to use said polyisocyanates in the form of being stabilized with an appropriate blocking agent having one active hydrogen in the molecule, such as methanol, n-butanol, benzyl alcohol, ε-caprolactam, methyl ethyl ketone oxime, phenol, cresol or the like.

Examples of said polycarboxylic acid having at least one acid anhydride group are tricarboxylic acid anhydrides such as trimellitic anhydride, 1,2,4-butanetricarboxylic acid 1,2-anhydride, 3,4,4'-benzophenonetricarboxylic acid 3,4-anhydride and the like; di- and monoanhydrides of tetrabasic acids such as aliphatic and alicyclic tetrabasic acids such as 1,2,3,4-butanetetracarboxylic acid, cyclopentane-tetracarboxylic acid, ethylene-tetracarboxylic acid, bicyclo-[2,2,2]-octo-(7)-ene-2:3,5:6-tetracarboxylic acid and the like, aromatic tetracarboxylic acids such as pyromellitic acid, 3,3',4,4'-benzophenonetetracarboxylic acid, bis(3,4-dicarboxyphenyl) ether, 2,3,6,7-naphthalenetetracarboxylic acid, 1,2,5,6-naphthalenetetracarboxylic acid, ethylene glycol bistrimellitate, 2,2'-bis(3,4-biscarboxyphenyl)-propane, 2,2',3,3'-diphenyltetracarboxylic acid, perylene-3,4,9,10-tetracarboxylic acid, 3,4-dicarboxyphenyl-sulfone and the like, and heterocyclic tetrabasic acids such as thiophene-2,3,4,5-tetracarboxylic acid, hydrazine-tetracarboxylic acid and the like.

From a polyisocyanate and a polycarboxylic acid having at least one acid anhydride group and free carboxyl group such as tricarboxylic acid anhydrides, there can be obtained a polyamide-imide. From a polyisocyanate and a polycarboxylic acid having at least one acid anhydride group which has only acid anhydride group(s) such as tetracarboxylic acid anhydrides, there can be obtained a polyimide. From the viewpoint of heat resistance and cost, trimellitic anhydride, 3,3',4,4'-benzophenonetetracarboxylic acid dianhydride, pyromellitic dianhydride and the like are preferable in general.

If necessary, polycarboxylic acids other than the above-mentioned polycarboxylic acids having at least acid anhydride group can also be used. As such carboxylic acids, there can be used, for example, trimellitic acid, trimesic acid, tris(2-carboxyethyl)-isocyanurate, terephthalic acid, isophthalic acid, succinic acid, adipic acid, sebacic acid, dodecanedicarboxylic acid and the like. These polycarboxylic acids can be used for modifying resin characteristics such as flexibility, solubility into solvent, melt-flow properties (processability) at the time of molding, and so on. Preferably, the polyisocyanate, the polycarboxylic acid having at least one acid anhydride group and the optionally used other carboxylic acid or acids are used in such amounts that equivalent ratio of total carboxyl groups in polycarboxylic acids to total isocyanate groups in polyisocyanates (total carboxyl groups/total isocyanate groups) falls in the range of 0.5–2.0. Here, one equivalent of acid anhydride group in polycarboxylic acids is regarded as one equivalent of carboxyl group. When the particulate polymer having imide groups is required to have a sufficiently high molecular weight and sufficiently high heat resistance and flexibility, equivalent ratio of carboxyl group to isocyanate group is controlled so as to become 0.85–1.15/1 and more preferably so as to become substantially 1/1. The reaction temperature between said polyisocyanate, polycarboxylic acid having at least one acid anhydride group and optionally used other polycarboxylic acid is preferably 80°–250° C. The state of progress of the reaction can be followed by observing the carbon dioxide gas bubbles formed.

The polymerization reaction is preferably carried out in a substantially anhydrous state. Accordingly, it is preferably carried out in an atmosphere of inert gas such as nitrogen gas. It is natural that the particulate polymer having imide groups obtainable by the production process of this invention cannot be produced by using water as dispersing medium, because the polyisocyanate speedily changes into an inert compound upon contact with water. In carrying out the reaction, all the starting compounds may be charged simultaneously, or it is also possible to charge the starting compounds stepwise in accordance with purpose while making the reaction proceed.

In this invention, some device should be made about the method for charging the reactants, with consideration of the properties of reactants. Preferably, at least one component of the reactants is soluble in non-aqueous organic liquid or keeps liquid at reaction temperature. A reactant which is solid at reaction temperature is used by dissolving it into a non-aqueous organic liquid before charge or in the course of reaction, or by fusing it into another reactant keeping liquid at reaction temperature. As a preferable embodiment, the reaction may be proceeded by adding a finely pulverized acid component to a homogeneous solution prepared by mixing a non-aqueous organic liquid and a polyisocyanate or to a heterogeneous solution prepared by dispersing a polyisocyanate into organic liquid in the state of oil droplets. It is also possible to make the reaction proceed by adding a polyisocyanate to a homogeneous solution prepared by mixing non-aqueous organic liquid and polycarboxylic acid or to a heterogeneous solution prepared by dispersing polycarboxylic acid into non-aqueous organic liquid in the state of oil droplets.

As the method of stirring during the reaction, there can be used a stirring method by means of emulsifying device (homomixer) which is accompanied by high speed shearing, a stirring method by means of propeller type agitator which is accompanied by no mechanical cutting of particles nor their pulverization. Said emulsifying device is preferably used in a region where the conversion of reactant to polymer is not high. As a preferable method of stirring, there can be referred to a method which comprises making the particles small-sized by means of emulsifying device in the early stage of the reaction, replacing the emulsifying device by a propeller type agitator when the rate of polymerization has reached a value giving a good dispersion stability, and further making the reaction proceed. By this method, a particulate polymer having relatively small particle diameter and uniform in particle size can be obtained.

According to the production process of this invention, the particulate polymer having imide groups can be obtained in the form of a dispersion in a non-aqueous organic liquid. Though the dispersion phase contains the reactant and the like in addition to the particulate polymer, these reactants and the like can be removed by purification.

The particulate polymer having imide groups produced by this method is obtained in the form of non-agglomerated particle having an average particle diameter of 0.05–2,000 microns or more. Preferable average particle diameter is 0.1–500 microns, and the most preferable particle diameter is 0.5–100 microns. Such a particulate polymer can be recovered from the dispersion by means of filtration or decantation, followed by drying under ordinary or reduced pressure.

According to one embodiment of this invention, the particulate polymer having imide groups can be obtained in the form of thermoplastic or thermosetting particulate polymer soluble in solvent. Optionally, such a polymer may be made into a composite material by adding thereto one or more members selected from epoxy resins, amino resins, phenol-formaldehyde resins, isocyanurate ring-containing polyisocyanates and hydroxyl group-containing polyester resins obtainable by using terephthalic and/or isophthalic acid as acid component. As said epoxy resins, bisphenol type of epoxy resins such as Epikote 828, 1001, 1004, 1007 and the like (trade names, mfd. by Shell Chemical Co.), epoxidized novolac resins such as DEN 431 and 438 (trade names, mfd. by Dow Chemical Co.) and the like, triglycidyl isocyanurate, and so on are preferably usable. As said amino resins, melamine-formaldehyde resin and its alkoxy-modified resins such as butoxybenzoguanamine-formaldehyde resin, hexamethoxymelamine resin and the like are preferable. As said phenol-formaldehyde resins, phenol-formaldehyde resin, alkylphenol-formaldehyde resin, melamine-modified phenol-formaldehyde resin composed mainly of these resins, benzoguanamine-modified phenol-formaldehyde resin, and the like are preferable. As said isocyanurate ring-containing polyisocyanates, a trimer produced by reacting an aromatic diisocyanate (particularly tolylene diisocyanate) in the presence of a tertiary amine, an isocyanurate ring-containing polyisocyanate mixture containing said trimer, masked products produced by masking them with phenols, alcohols, lactams, or oximes, and so on are preferable. As said hydroxyl group-containing polyester resins obtainable by using terephthalic acid and/or isophthalic acid as acid component, a polyester resin produced by using tris(2-hydroxyethyl) isocyanurate as branching component, a polyester-imide resin, a polyester-amide resin and the like are preferable. The above-mentioned particulate polymers having imide groups and their composite materials exhibit good heat resistance, mechanical properties and electrical properties, and are useful as heat-resistant coating material, heat-resistant sheet, heat-resistant adhesive, heat-resistant laminating material, heat-resistant molded article, heat-resistant composite materials combined with glass fiber or carbon fiber, and so on.

The particulate polymer having imide groups obtainable by the production process of this invention can be obtained in the form of gel particle having a three-dimensional network structure and insoluble in solvent. Said gel particle is useful also as adsorbent for inorganic elements and separating material for organic compounds.

Further, this invention also provides a process for producing a particulate polymer having imide groups which comprises reacting (I) a polyisocyanate, (II) a polycarboxylic acid having at least one acid anhydride group and optionally (III) a polycarboxylic acid other than the above-mentioned (II) in the presence of:
- (A) a first non-aqueous organic liquid in which the resulting particulate polymer having imide groups is substantially insoluble,
- (B) a dispersion stabilizer soluble in the (A), and
- (C) a second non-aqueous organic liquid which is substantially immiscible with the (A) and in which the resulting particulate polymer having imide groups is soluble or swellable, to obtain a particulate polymer having imide groups dispersed in the (A).

According to this production process of second invention, the particulate polymer having imide groups can easily be recovered by a procedure of filtration, because it is obtained in the form of a dispersion of relatively small particles in the first non-aqueous organic liquid. Further, in this production process of this invention, an inexpensive general-purpose solvent in which the resulting particulate polymer having imide groups is substantially insoluble can be used as the first non-aqueous organic liquid. Unlike the solution polymerization process where the content of solid component is restricted by the solubility of the polymer having imide groups in solvent, the process of this invention enables to obtain so high a solid content in non-aqueous organic liquid as 50% by weight or more.

Further, in this invention, the conversion of the reactants (a polyisocyanate, a polycarboxylic acid having at least one acid anhydride group and optionally used other carboxylic acid or acids; hereinafter meaning the same) can sufficiently be enhanced in the reaction temperature range of solution polymerization process, and the reaction can be completed under relatively mild conditions, so that drop in purity caused by side reactions and the like can be prevented.

As the first non-aqueous organic liquid, the same ones as used in the first invention can be used.

Preferable examples of the first non-aqueous organic liquid which can give desirable results in the second invention are n-hexane, octane and dodecane, as well as ISOPAR-E, ISOPAR-H and ISOPAR-K (trade names, manufactured by Esso Standard Petroleum Co.; petroleum type of saturated aliphatic or alicyclic hydrocarbons having boiling temperatures ranging from about 40° to 300° C.).

The dispersion stabilizer used in this invention is not critical, so far as it is soluble in the first non-aqueous organic liquid, it can form a stabilizing layer on the surface of the resulting particulate polymer having imide groups, and it has a function of stabilizing the dispersion state of particles at least in the course of polymerization. As such a dispersion stabilizer, for example, a resin which simultaneously has a first organic constituent having affinity to the polymer having imide groups or the polymer-forming reactant solution (a solution formed from a polyisocyanate, a polycarboxylic acid having acid anhydride group and the second non-aqueous organic liquid) constiting the dispersed phase and a second organic constituent soluble in the first non-aqueous organic liquid constituting the continuous phase can be used.

As said first organic constituent having affinity to the dispersed phase, there can be used mainly aromatic type chain polymers linked together through intermediation of polar groups such as ether group, ester group, amide group, imide group or the like (for example, chain polyesters obtainable from terephthalic acid or isophthalic acid and a dihydric alcohol, polyamides, polyamide-imides, polyimides, polyetheramides, polyester-amides, polyester-amide-imides, polyester-imides and bisphenol type epoxy resins), as well as polymers and copolymers of vinyl monomers having polar group such as acrylonitrile, acrylamide, vinylpyrrolidone, vinylpyridine, vinyllactam and the like. As the second organic constituent soluble in the continuous phase (the first non-aqueous organic liquid), mainly aliphatic type chain polymers having low porality are used, of which examples include polymers and copolymers of butyl, hexyl, 2-ethylhexyl, octyl, lauryl or stearyl ester of acrylic or methacrylic acid; monoalkoxide of polyethylene oxide having a degree of polymerization of 3–100; monoalkoxide of polypropylene oxide having a degree of polymerization of 3–100, its monomethacrylate (for example, polymer and copolymer of NK Ester M-9G and M-23G (trade names, manufactured by Shin-Nakamura Kagaku K. K.)); vinyl polymers such as polybutadiene, polyisoprene and the like; one end-blocked product of poly(hydroxyfatty acid ester) having a molecular weight of 1,000 or more (for example, self-condensate of 12-hydroxystearic acid of which one end is blocked with monobasic carboxylic acid or monohydric alcohol; polymer or copolymer of its glycidyl methacrylate adduct); degraded natural rubber, cellulose derivatives; and the like.

These first and second organic constituents are obtained in the form of random polymer, block polymer or graft polymer in which both the constituents are mutually linked through chemical bonds.

As another example of usable dispersion stabilizer, there can be used a resin having one or more functional group(s) reactive with either one of isocyante group, acid anhydride group and carboxyl group which are contained in the reactants. As such functional groups, the followings can be exemplified. Examples of functional groups reactive with the isocyanate group are a hydroxyl group, a carboxyl group, a methylol group, an amino group, an acid anhydride group, an epoxy group and the like, among which the hydroxyl group is preferable. As functional groups reactive with the acid anhydride group and the carboxyl group, there can be exemplified an isocyanate group, a hydroxyl group, an amino group, an epoxy group and the like, among which the hydroxyl group is preferable as a group reactive with the acid anhydride group, and the hydroxyl group or epoxy group is preferable as a group reactive with the carboxyl group. As the resin having such functional group, there are used alkoxy-modified amino resins such as butylated bezoguanamine-formaldehyde resin, butylated melamine-formaldehyde resin and the like; telechelic rubber having an average molecular weight of about several thousands and having hydroxyl group, carboxyl group, acid anhydride group, epoxy group, isocyanate group, mercaptan group or the like; degraded natural rubber; and the like. Further, as the dispersion stabilizer, there are also used a product prepared by introducing a functional group into the first organic constituent of random polymer, block polymer or graft polymer obtained by combining the above-mentioned first and second organic constituents through intermediation of chemical bond, as well as a product prepared by introducing functional group into the above-mentioned second organic constituent soluble in the continuous phase (the first non-aqueous organic liquid), and the like. A method for introducing functional groups into these resins is as follows. When the dispersion stabilizer is a vinyl polymer, a functional group can be introduced by copolymerizing a vinyl monomer having the functional group. As examples of vinyl monomer having one or more hydroxyl groups, there can be used allyl alcohol, hydroxyethyl or hydroxypropyl ester of acrylic acid or methacrylic acid, acrylic ester or methacrylic ester of polyethylene oxide having a degree of polymerization of 3-100 or polypropylene oxide having a degree of polymerization of 3-100, and the like. As vinyl monomer having one or more carboxyl groups, for example, acrylic acid, methacrylic acid, itaconic acid and the like can be used. As vinyl monomer having one or more acid anhydride groups, for example, maleic anhydride, itaconic anhydride and the like can be used. As vinyl monomer having one or more epoxy groups, for example, glycidyl ester of acrylic acid or methacrylic acid, their arylglycidyl esters, and the like can be used. As vinyl monomer having one or more methylol groups, methylol-acrylamide and the like can be used.

In the case of addition polymer or condensation polymer, functional groups can easily be introduced thereinto by leaving the functional group of the monomer for forming the polymer or the functional group formed by a reaction, at the end of the polymer. In the case of polyethylene oxide, polypropylene oxide and the like, a hydroxyl group can be left. In the case of polyester obtained from a polycarboxylic acid or its anhydride and a polyhydric alcohol, the carboxyl group, acid anhydride group or hydroxyl group can be left. In the case of polyamide, polyimide or polyamide-imide obtained from polycarboxylic acid or its acid anhydride and polyisocyanate or polyamine, the carboxyl group, acid anhydride group, isocyanate group, amino group or the like can be left.

Resins preferably usable as dispersion stabilizer are hydroxyl group-containing vinyl polymers of which main chain is formed from long chain alkyl ($C_{12}$ or higher) ester of acrylic or methacrylic acid, and hydroxyl group-containing vinyl polymers of which main chain is formed from monoalkoxy-monomethacrylate or monoalkoxy-monoacrylate of propylene oxide having a degree of polymerization of 20 or more.

The molecular weight of the dispersion stabilizer is preferably 1,000 or more. If it is less than 1,000, agglomeration can readily take place in the course of the polymerization. A particularly preferable range of molecular weight is 1,000-50,000.

When the above-mentioned functional group is let exist in dispersion stabilizer, the amount of functional group is preferably at least 1 and at most 20, per one molecule of dispersion stabilizer. If it is less than 1, the dispersion stabilizer cannot be combined with the resulting polymer having imide groups, as the result of which no stabilizing layer can be formed on the surface of polymer particle and agglomeration takes place readily. If it exceeds 20, the resulting polymer having imide groups can undergo an undesirable gelation. Concretely saying, the hydroxyl group-containing vinyl polymer used as dispersion stabilizer preferably has such a monomer composition that it consists of 2-20% by weight of one or more hydroxyl group-containing acrylic monomer and 80-98% by weight of one or more long chain alkyl ($C_{12}$ or higher)-containing acrylic monomer and/or an acrylic monomer having monoalkoxide of polypropylene oxide having a degree of polymerization of 20 or higher which are soluble in aliphatic or alicyclic hydrocarbons.

The second non-aqueous organic liquid usable in this invention is a non-aqueous organic liquid which is substantially immiscible with the first non-aqueous organic liquid, in which the resulting particulate polymer having imide groups is soluble or swellable, which is inert in its nature and therefore does not obstruct the reaction, which can dissolve or swell at least one of the reactants, and which can function as a solvent for promoting the mutual contact of terminal groups in the course of polymerization reaction and thereby achieving a high molecular weight of the resulting polymer having imide groups. Herein, the term "substantially immiscible with the first non-aqueous organic liquid" means that the second non-aqueous organic liquid includes not only those perfectly insoluble in the first non-aqueous organic liquid but also those which are not perfectly insoluble with the first non-aqueous organic liquid but it is immiscible therewith only to such an extent that the two liquids separate into phases at a certain mixing ratio. Such a second non-aqueous organic liquid is a polar liquid and preferably has a greater affinity to the resulting polymer having imide groups or reactant in dispersed phase than the first non-aqueous organic liquid has. Examples of said second non-aqueous organic liquid are N-methylpyrrolidone, dimethylformamide, dimethylacetamide, $\gamma$-butyrolactone, phenol, cresol and the like. They may be used either alone or as a mixture thereof. Preferably, a combination of aliphatic or alicyclic hydrocarbon, as the first non-aqueous organic liquid, and N-methylpyrrolidone is empolyed.

As the polyisocyanate used in this invention, the same ones as used in the first invention can be used.

As the polycarboxylic acid having at least one acid anhydride group used in this invention, the same ones as used in the first invention can be used.

The second invention is similar to the first invention in that at least one polycarboxylic acid other than the above-mentioned polycarboxylic acid having at least one acid anhydride group used in the first invention, can optionally be used.

As to the ratio between the amount of the first non-aqueous organic liquid constituting continuous phase and the amount of reactants consituting the dispersed phase, the amount of reactants is preferably in the range of 10-80% by weight based on the summed amounts of the first non-aqueous organic liquid and the reactants. The ratio of 40% by weight or more is particularly preferable from the viewpoint of efficiency of production and cost.

As to the ratio between the amounts of dispersion stabilizer and reactants, the amount of dispersion stabilizer is preferably in the range of 0.5-20% by weight based on the summed amounts of dispersion stabilizer and reactants. The ratio of 10% by weight or less is particularly preferable from the viewpoint of heat resistance.

As to the ratio between the amount of the second non-aqueous organic liquid and the amount of reactants, the amount of the second non-aqueous organic liquid is preferably in the range of 0.5-70% by weight based on the summed amounts of the second non-aqueous organic liquid and the reactants. If it is less than 0.5% by weight, the polymerization can proceed only at a high temperature, so that undesirable side reactions can readily take place. If it exceeds 70% by weight, the reactants are dissolved into the second non-aqueous organic liquid to give a continuous phase having a high density, which separates from the phase of the first non-aqueous organic liquid having a low density and makes it difficult to form a dispersion phase. Even if a dispersion phase is formed, it readily undergoes agglomeration in the course of polymerization reaction, which is disadvantageous from the viewpoint of cost. A particularly preferable range is 2–40% by weight.

The temperature of the reaction of polyisocyanate, polycarboxylic acid having acid anhydride group and optionally used other polycarboxylic acid is preferably 80°–250° C.

Preferably, the polymerization is carried out in a substantially anhydrous state. Accordingly, it is desirable to carry out the reaction in an atmosphere of inert gas such as nitrogen gas. It is natural that the particulate polymer having imide groups produced by the production process of this invention cannot be produced in a water medium, because its reactants, particularly polyisocyanates, speedily change into an insert compound upon contact with water. The reaction may be carried out by charging all the starting compounds at once or by stepwise charging them in accordance with purposes, while making the reaction proceed.

It is preferable that at least one of the reactants is either soluble or swellable in the second non-aqueous organic liquid, or liquid at the reaction temperature. In a preferable embodiment, the reaction can be conducted by adding a finely pulverized acid component to a homogeneous solution prepared by mixing together all the components other than the acid component or to a heterogeneous solution prepared by dispersing a homogeneous solution of the polyisocyanate and the second non-aqueous organic liquid into the first non-aqueous organic liquid in the form of oil droplets. By this method, the polymerization can be conducted at a relatively low temperature, so that undesirable side reactions can be prevented.

It is also possible to carry out the reaction by adding the polyisocyanate to a homogeneous solution prepared by mixing together all the components other than the acid component or to a heterogeneous solution prepared by dispersing a homogeneous solution of the acid component and the second non-aqueous organic liquid into the first non-aqueous organic liquid in the form of oil droplets. It is also possible to stepwise add a dispersion stabilizer for the purpose of maintaining dispersion stability of particulate polymer in the course of polymerization reaction and to make the particles small-sized. It is also possible to use the dispersion stabilizer in the form of a solution.

It is also possible that the particulate polymer having imide groups produced by the invention may be stabilized by adding and reacting an appropriate blocking agent having one active hydrogen in the molecule, such as methanol, n-butanol, benzyl alcohol, ε-caprolactam, methyl ethyl ketone oxime, acetaldoxime, phenol, cresol or the like, either in the course of the reaction or after the reaction.

As the method of stirring during the reaction, there can be used a stirring method by means of emulsifying device (homomixer) which is accompanied by high speed shearing, a stirring method by means of propeller type agitater which is accompanied by no mechanical cutting of particles nor their pulverization. Said emulsifying device is preferably used in a region where conversion of the reactants to polymer is not high. As a preferable method of stirring, there can be used a method which comprises making the particles small-sized by means of emulsifying device in the early stage of the reaction, replacing the emulsifying device by a propeller type of agitater when the rate of polymerization has reached a value giving good dispersion stability, and further making the reaction proceed. By this method, a particulate polymer having a relatively small particle diameter and uniform in particle size can be obtained.

According to the production process of this invention, the particulate polymer having imide groups can be obtained in the form of a dispersion in the first non-aqueous organic liquid. Though the dispersion phase contains the second non-aqueous organic liquid, dispersion stabilizer, reactants and the like in addition to the particulate polymer, they can be removed by purification.

The particulate polymer having imide groups produced by this process is obtained in the form of non-agglomerated particles having an average particle diameter of 0.05–2,000 microns or more. Preferable average particle diameter is 0.1–500 microns, and the most preferable particle diameter is 0.5–100 microns. Such a particulate polymer can be recovered from the dispersion by means of filtration or decantation, followed by drying under ordinary or reduced pressure.

The particulate polymer having imide groups which has been recovered or which is not yet recovered may optionally be heat-treated at a temperature of 100°–400° C., preferably 150°–300° C., whereby the dispersion stabilizer present in the particulate polymer can be thermally released or thermally decomposed and heat resistance of the polymer can be improved.

Optionally, the particulate polymer having imide groups obtained by this invention may be made into a composite material by incorporating thereinto one or more members selected from epoxy resins, amino resins, phenol-formaldehyde resins, isocyanurate ring-containing polyisocyanates and hydroxyl group-containing polyester resins obtained by using terephthalic acid and/or isophthalic acid as acid component. As said epoxy resins, Bisphenol type of epoxy resins such as Epikote 828, 1001, 1004, 1007 and the like (trade names, mfd. by Shell Chemical Co.), epoxidized novolac resins such as DEN 431 and 438 (trade names, mfd. by Dow Chemical Co.) and the like, triglycidyl isocyanurate, and so on are preferably usable. As said amino resins, melamine-formaldehyde resin and its alkoxy-modified resins such as butoxybenzoguanamine-formaldehyde resin, hexamethoxymelamine resin and the like are preferable. As said phenol-formaldehyde resins, phenol-formaldehyde resin, alkylphenol-formaldehyde resin, melamine-modified phenol-formaldehyde resin composed mainly of these resins, benzoguanamine-modified phenol-formaldehyde resin, and the like are preferable. As said isocyanurate ring-containing polyisocyanates, a trimer produced by reacting an aromatic diisocyanate (particularly tolylene diisocyanate) in the presence of a tertiary amine, an isocyanurate ring-containing polyisocyanate mixture containing said trimer, masked products produced by masking them with phenols, alcohols, lactams or oximes, and so on are preferable. As said hydroxyl group-containing polyester resins obtainable by using terephthalic acid and/or isophthalic acid as acid component, a polyester resin produced by using tris(2-hydroxyethyl) isocyanurate as branching component, a polyester-imide resin, a polyester-amide resin and the like are preferable. The above-mentioned particulate polymers having imide groups and their composite materials exhibit good heat resistance, mechanical properties and electrical properties, and are useful as heat-resistant coating material, heat-resistant sheet, heat-resistant adhesive, heat-resistant laminating material, heat-resistant molded article, heat-resistant composite materials combined with glass fiber or carbon fiber, and so on.

Next, this invention further provides a process for producing a particulate gel polymer having imide groups, and more particularly to a process for producing a particulate gel polymer having imide groups and excellent in heat resistance which is usable as adsorbent for inorganic elements and separating material for organic compounds.

It is known that a solution of polymer having imide groups, such as solution of polyamide-imide, solution of polyimide and the like, can be produced by reacting a polyisocyanate with a polycarboxylic acid having at least one acid anhydride group in the state of solution in a polar solvent such as N-methyl-2-pyrrolidone, N,N-dimethylformamide, N,N-dimethylacetamide or the like.

However, if the solution polymerization is carried out with a resin composition containing a cross-linking component in an amount enough to cause gelation, a non-flowable gel containing the solvent is formed finally.

If a solid crosslinked polymer is produced from gel, the solvent must be removed or recovered by a quite ineconomical process, and its industrial practice has an important problem from the viewpoint of cost. Further, the solid polymer thus obtained has a shape of crushed material, and it cannot be obtained in a spherical shape. As a process for producing spherical crosslinked polymer, aqueous suspension polymerization is generally known. However, the aqueous suspension polymerization is impossible in the present case, because the reaction between the polyisocyanate and the polycarboxylic acid having at least one acid anhydride group requires a high temperature exceeding 100° C. and the isocyanate is reactive with water.

The present inventors conducted repeated studies on an inexpensive process for producing particulate gel polymer having imide groups and excellent in heat resistance. As a result, a process for producing a particulate gel polymer having imide groups which is dispersed in a non-aqueous organic liquid was accomplished.

The third invention relates to a process for producing a particulate gel polymer having imide groups which comprises reacting (I) a polyisocyanate having a functionality of 3 or higher together with an optionally used bifunctional isocyanate, (II) a polycarboxylic acid having at least one acid anhydride group and optionally (III) a polycarboxylic acid other than the above-mentioned (II), in the presence of:
 (A) a first non-aqueous organic liquid in which the resulting particulate polymer is substantially insoluble,
 (B) a dispersion stabilizer soluble in the (A), and
 (C) a second non-aqueous organic liquid which is substantially immiscible with the (A) and in which the resulting particulate polymer having imide groups is soluble or swellable,
until the resulting particulate polymer having imide groups becomes insoluble in the (C), and thereby obtaining a particulate polymer having imide groups dispersed in the (A).

As the first non-aqueous organic liquid used in the third invention, the same ones as used in the first and second inventions can be used.

In the third invention, preferable examples of the first non-aqueous organic liquid giving desirable results are n-hexane, octane and dodecane, as well as ISOPAR-E, ISOPAR-H and ISOPAR-K (trade names, mfd. by Esso Standard Petroleum Co.; petroleum type of saturated aliphatic or alicyclic hydrocarbons having boiling points in the range of about 40°–300° C.).

As the dispersion stabilizers usable in the third invention, the same ones as used in the second invention can be used.

The second non-aqueous organic liquid used in the third invention which is substantially immiscible with the first non-aqueous organic liquid and in which the resulting particulate polymer having imide groups is soluble or swellable is a non-aqueous organic liquid which is inert in its nature and does not obstruct the polymerization reaction. As such a second non-aqueous organic liquid, the same ones as used in the second invention can be used.

In the third invention, polyisocyanates having a functionality of 3 or higher are used as said polyisocyanate. Optionally, they may be used in combination with one or more bifunctional isocyanates. The polyisocyanates having a functionality of 3 or higher function as a cross-linking component for obtaining the desired particulate gel polymer having imide group.

As the polyisocyanates having a functionality of 3 or higher usable in this invention, there can be used compounds obtainable by trimerizing diisocyanates, of which examples include trimers of aromatic diisocyanates such as tolylene diisocyanates, xylylene diisocyanate, 4,4'-diphenylether diisocyanate, naphthylene-1,5-diisocyanate, 4,4'-diphenylmethane diisocyanate, etc.; trimers of aliphatic diisocyanates such as ethylene diisocyanate, 1,4-tetramethylene diisocyanate, 1,6-hexamethylene diisocyanate, 1,12-dodecane diisocyanate, etc.; and trimers of alicyclic diisocyanates such as cyclobutene-1,3-diisocyanate, cyclohexane-1,3- and 1,4-diisocyanates, isophorone diisocyanate, etc.; as well as triisocyanate compounds such as triphenylmethane-4,4',4''-triisocyanate, polyphenylmethyl-polyisocyanate, a phosgenated product of aniline-formaldehyde condensate and the like. Since trimers of diisocyanates have an isocyanurate ring, they are useful not only as a cross-linking agent but also as an agent for making the resulting polymer heat resistant.

As said bifunctional isocyanates optionally used in combination, there can be used, for example, aromatic diisocyanates such as tolylene diisocyanate, xylylene diisocyanate, 4,4'-diphenylether diisocyanate, naphthylene-1,5-diisocyanate, 4,4-diphenylmethane diisocyanate and the like; aliphatic diisocyanates such as ethylene diisocyanate, 1,4-tetramethylene diisocyanate, 1,6-hexamethylene diisocyanate, 1,12-dodecane diisocyanate and the like; and alicyclic diisocyanates such as cyclobutene-1,3-diisocyanate, cyclohexane-1,3-and 1,4-diisocyanates, isophorone diisocyanate and the like. From the viewpoint of heat resistance, it is preferable to use aromatic diisocyanates such as tolylene diisocyanate, 4,4'-diphenylether diisocyanate, 4,4'-diphenylmethane diisocyanate and the like. A preferable process for producing isocyanurate ring-containing polyisocyanates is mentioned in Japanese Patent application No. 148,820/78.

In order to control the reaction rate in the process of polycondensation reaction and to obtain a stable particulate polymer, it is also possible to use a polyisocyanate of which isocyanate groups have partially or wholly been stabilized with an appropriate blocking agent having one active hydrogen in the molecule, such as methanol, n-butanol, benzyl alcohol, ε-caprolactam, methyl ethyl ketone oxime, phenol, cresol or the like.

As the polycarboxylic acid having at least one acid anhydride group, the same ones as used in the first and second inventions can be used.

The third invention is similar to the first and second inventions in that a polycarboxylic acid other than the above-mentioned polycarboxylic acid having at least one acid anhydride group may also be used optionally.

Among these polycarboxylic acids, polycarboxylic acid having a functionality of 3 or higher function as a branching component for giving the desired particulate gel polymer. Preferably, the amounts of said polyisocyanate, said polycarboxylic acid having acid anhydride group and said optionally used polycarboxylic acid other than it are so controlled that the equivalent ratio of total carboxyl groups of the polycarboxylic acids to total isocyanate groups of the polyisocyanate (total carboxyl group/total isocyanate group) falls in the range of 0.1–3.0/1, and particularly preferably 0.3–2.0/1. Herein, one equivalent of acid anhydride group of the polycarboxylic acids is regarded as one equivalent of carboxyl group. The ratio of the amount of the first non-aqueous organic liquid constituting the continuous phase to the amount of the reactants constituting the dispersed phase is preferably in the range of 10–80% by weight of the reactants based on the summed amounts of the first non-aqueous organic liquid and the reactants. The proportion of 40% by weight or more is particularly preferable from the viewpoint of efficiency of production and cost.

The ratio of the amount of dispersion stabilizer to the amount of reactants is preferably in such a range that the proportion of dispersion stabilizer is in the range of 0.5–20% by weight based on the summed amounts of dispersion stabilizer and reactants. The ratio of the amount of the second non-aqueous organic liquid to the amount of reactants is preferably in such a range that proportion of the second non-aqueous organic liquid is 0.5–70% by weight based on the summed amounts of the second non-aqueous organic liquid and reactants. If it is less than 0.5% by weight, it is considerably difficult to proceed the polymerization reaction. If it exceeds 70% by weight, the reactants dissolve into the second non-aqueous organic liquid to form a continuous phase having a high density, as a result of which it separates from the first non-aqueous organic liquid phase having a low density so that dispersed phase becomes difficult to form. Even if it can be formed, it readily undergoes agglomeration in the course of polymerization reaction. Thus, a particularly preferable proportion of the second non-aqueous organic liquid is 2–40% by weight based on the summed amounts of the second non-aqueous organic liquid and reactants.

The reaction of the polyisocyanate having a functionality of 3 or higher, the polycarboxylic acid having acid anhydride group and the optionally used other polycarboxylic acid can be carried out until the resulting polymer having imide groups becomes insoluble in the second non-aqueous organic liquid. The reaction temperature of this reaction is preferably 80°–250° C.

Insolubility of the resulting particulate polymer in the second organic liquid can be ascertained by taking out a part of the resulting particulate polymer from the dispersion and checking its solubility in, for example, N-methyl-2-pyrrolidone. If the particulate polymer has gelled, it does not dissolve in N-methyl-2-pyrrolidone, so that the N-methyl-2-pyrrolidone is not colored.

The polymerization reaction is preferably carried out in a substantially anhydrous state. Accordingly, it is desirable to carry out the reaction in an inert atmosphere of nitrogen gas or the like. It is natural that the particulate polymer obtained by the production process of this invention cannot be produced as a dispersion in water medium, because the reactants, particularly polyisocyanate, speedily changes into an inactive substance upon contact with water. The reaction may be carried out by charging all the starting compounds at once or by stepwise charging them in accordance with purposes while making the reaction proceed.

In this invention, a certain device is necessary about the method for charging the reactants depending on the natures of the reactants. It is preferable that at least one component of the reactants is either soluble or swellable in the second non-aqueous organic liquid, or liquid at the reaction temperature. In one preferable embodiment, the reaction is carried out by adding a finely pulverized acid component to a homogeneous solution prepared by mixing all the components other than the acid component or to a heterogeneous solution prepared by dispersing a homogeneous solution of polyisocyanate and the second non-aqueous organic liquid into the first non-aqueous organic liquid in the state of oil droplets. According to this method, the polymerization reaction can be conducted at a relatively low temperature, so that undesirable side reactions can be prevented.

It is also possible to carry out the reaction by adding a polyisocyanate to a homogeneous solution prepared by mixing together all the components other than polyisocyanate or to a heterogeneous solution prepared by dispersing a homogeneous solution of acid component and the second non-aqueous organic liquid into the first non-aqueous organic liquid in the state of oil droplets.

In order to maintain the dispersion stability of particulate polymer in the course of polymerization reaction and to make the particles small-sized, it is also possible to use a method which comprises stepwise adding the dispersion stabilizer. The dispersion stabilizer may also be used as a solution.

Optionally, the particulate polymer obtained by this invention may be stabilized, either in the course of the reaction or after the reaction, by adding and reacting an appropriate blocking agent having one active hydrogen in the molecule such as methanol, n-butanol, benzyl alcohol, ε-caprolactam, methyl ethyl ketone oxime, acetoaldoxime, phenol, cresol or the like.

As the method of stirring during the reaction, there can be used a stirring method by means of emulsifying device (homomixer) which is accompanied by high speed shearing, a stirring method by means of propeller type agitater which is accompanied by no mechanical cutting of particles nor their pulverization, or the like. Said emulsifying device is used preferably in a region where conversion of the reactants to polymer is not high. As a preferable method of stirring, there can be used a method which comprises making the particles small-sized by means of an emulsifying device in the early stage of the reaction, replacing the emulsifying device by a propeller type of agitater when rate of polymerization has reached a value giving a good dispersion stability, and further making the reaction proceed. By this method, a particulate polymer having a relatively small particle diameter and uniform in particle size can be obtained.

According to the production process of this invention, the particulate polymer having imide groups can be obtained in the form of dispersion in the first non-aqueous organic liquid. Though the dispersion phase contains the second non-aqueous organic liquid, dispersion stabilizer, reactants and the like in addition to the particulate polymer, they can be removed by purification.

The particulate polymer having imide groups produced by this method is obtained in the form of non-agglomerated particle having an average particle diameter of 0.05–2,000 microns or more. Preferable average particle diameter is 0.1–500 microns, and the most preferable particle diameter is 0.5–100 microns. Such a particulate polymer can be recovered from the dispersion by means of filtration or decantation, followed by drying under ordinary or reduced pressure.

The particulate gel polymer having imide groups which has been recovered or which is not yet recovered may optionally be heat-treated at a temperature of 100°–400° C., preferably 150°–300° C., whereby the dispersion stabilizer present in the particulate gel polymer can be thermally released or thermally decomposed and heat resistance of the polymer can improved.

The particulate polymer having imide groups obtained by the third invention has a shape of sperical gel insoluble in solvent or a crushed form, and exhibits good heat resistance. Such gel particles are useful as adsorbent for inorganic elements and separating material for organic compounds.

Hereunder, this invention will be illustrated with reference to examples.

EXAMPLE 1

In a four-necked flask equipped with a thermometer, a stirrer and a bulb type reflux condenser, 75 g of 4,4'-diphenylmethane diisocyanate and 308 g of cyclohexanone were placed and heated to 80° C. with stirring. Then, 57 g of trimellitic anhydride, beforehand finely pulverized by means of a mortar, was added and heated to 150° C. over a period of 3 hours under a stream of nitrogen. Subsequently, the mixture was kept at that temperature for 4 hours to make the reaction proceed. Thus, a brown-colored particulate polymer dispersed in cyclohexanone was obtained. It was recovered by filtration and dried at 60° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. Its reduced viscosity was 0.13, as measured in 0.5 g/100 ml dimethylformamide solution at 30° C. This particulate polyamide-imide polymer had an average particle size of about 10 microns.

EXAMPLE 2

In a four-necked flask equipped with a thermometer, a stirrer and a bulb type reflux condenser, 122 g of ISOPAR-H (a trade name, mfd. by Esso Standard Oil Co.), 13 g of N-methylpyrrolidone and 57 g of trimellitic anhydride were placed and heated to 180° C. to obtain a transparent solution separated into two layers. While vigorously stirring the solution by means of emulsifying device under a stream of nitrogen, 40 g of 4,4'-diphenylmethane diisocyanate, molten at 60° C., was dropped thereinto over a period of 1 hour. Then, the resulting mixture was reacted at that temperature until generation of carbon dioxide gas ceased. Subsequently, the emulsifying device was replaced by a propeller type agitater, and 35 g of 4,4'-diphenylmethane diisocyanate, molten at 60° C., was dropped thereinto over a period of 1 hour. Reaction was continued for an additional 4 hours while keeping the mixture at 180° C. Thus, a brown-colored particulate polymer dispersed in ISOPAR-H was obtained. It was recovered by filtration, washed with n-hexane and then dried at 60° C. for 5 hours under reduced pressure. Infrared absorption spectrum of this particulate polyer showed an absorption of imide bond at 1780 cm$^{-1}$ and absorptions of amide bond at 1650 cm$^{-1}$ and 1540 cm$^{-1}$. Its reduced viscosity was 0.3, as measured in 0.5 g/100 ml dimethylformamide solution. Particle size of this particulate polyamide-imide polymer reached about 500 microns in the fraction of largest size, and the average particle size was about 20 microns.

EXAMPLE 3

In a four-necked flask equipped with a thermometer, a stirrer and a bulb type reflux condenser, 125 g of 4,4'-diphenylmethane diisocyanate and 286 g of cyclohexanone were placed and heated to 80° C. with stirring. Then, 161 g of 3,3', 4,4'-benzophenonetetracarboxylic acid dianhydride, finely pulverized in mortar, was added, and the resulting mixture was heated to 110° C. over a period of 3 hours under a stream of nitrogen. Subsequently, it was heated to 135° C. and reacted at this temperature for 3 hours. Thus, a brown-colored particulate polymer dispersed in cyclohexanone was obtained, which was collected by filtration and dried at 60° C. for 5 hours under reduced pressure. Infrared absorption spectrum of this particulate polymer showed an absorption of imide bond at 1780 cm$^{-1}$. This particulate polyimide polymer had an average particle size of 20 microns.

EXAMPLE 4

(1) Synthesis of Isocyanurate Ring-Containing Polyisocynate

| Component | Grams |
|---|---|
| Tolylene diisocyanate | 600 |
| Xylene | 600 |
| 2-Dimethylaminoethanol (catalyst) | 1.8 |

The above-mentioned components were introduced into a four-necked flask equipped with a thermometer and a stirrer, heated to 140° C. under a stream of nitrogen and reacted at this temperature until content of isocyanate group (initial concentration: 48% by weight) reached 25% by weight. Infrared absorption spectrum of the product showed absorptions of isocyanurate ring at 1710 cm$^{-1}$ and 1410 cm$^{-1}$ and an absorption of isocyanate group at 2260 cm$^{-1}$.

(2) Synthesis of Particulate Polymer Having Imide Groups

In a four-necked flask equipped with a thermometer, a stirrer and a fractionating tube, 220 g of ISOPAR-H (a trade name, mfd. by Esso Standard Oil Co.), 22 g of N-methylpyrrolidone and 96 g of trimellitic anhydride were placed and heated to 180° C. to obtain a transparent solution separated into two layers. While vigorously stirring the solution with emulsifying device under a stream of nitrogen, a mixed solution consisting of 50 g of the isocyanurate ring-containing polyisocyanate synthesized in (1) (50% solution) and 100 g of 4,4'-diphenylmethane diisocyanate was dropped thereinto over a period of 20 minutes. Subsequently, the emulsifying device was replaced by a propeller type agitater, and the reaction was proceeded at that temperature for 6 hours. The xylene distilled out in the course of the reaction was removed out of the system. Thus, a particulate polymer dispersed in ISOPAR-H was obtained. It was recovered by filtration, washed with n-hexane and then dried at 150° C. for 5 hours. Infrared absorption spectrum of this particulate polymer showed an absorption of imide bond at 1780 cm$^{-1}$ and absorptions of amide bond at 1650 cm$^{-1}$ and 1540 cm$^{-1}$. This particulate polyamide-imide polymer was a gel particle insoluble in polar solvents such as N-methylpyrrolidone, dimethylformamide, and the like. Its particle size reached 200 microns in the largest fraction, and the average particle size was about 20 microns.

EXAMPLE 5

(1) Synthesis of Dispersion Stabilizer

In a four-necked flask equipped with a thermometer, a stirrer and a bulb type reflux condenser, 152 g of ISOPAR-H (trade name of aliphatic hydrocarbon manufactured by Esso Standard Oil Co.) was placed and heated to 120° C. While introducing nitrogen gas, a beforehand prepared mixture consisting of 183 g of lauryl methacrylate, 17 g of 2-hydroxyethyl methacrylate and 10 g of benzoyl peroxide paste (benzoyl peroxide content 50% by weight) was dropped thereinto with stirring over a period of 2 hours. Subsequently, the mixture was heated to 140° C., and reacted at this temperature for 4 hours. When baked at 170° C. for 30 minutes, this dispersion stabilizer solution gave 50.5% by weight of non-volatile component. Number average molecular weight of the dispersion stabilizer was 14,000.

(2) Synthesis of Particulate Polymer Having Imide Groups

While introducing nitrogen gas into a four-necked flask equipped with a thermometer, a stirrer and a bulb type reflux condenser, 75 g of 4,4'-diphenylmethane diisocyanate, 19 g of the dispersion stabilizer solution obtained in (1) (non-volatile content 50.5% by weight), 150 g of ISOPAR-H (a trade name of aliphatic hydrocarbon manufactured by Esso Standard Oil Co.) and 33 g of N-methylpyrrolidone were introduced thereinto and heated to 90° C. with stirring. In this state, the mixture gave a homogeneous solution. Then, 57 g of beforehand finely pulverized trimellitic anhydride was added, and the reaction was proceeded by heating the mixture at 100° C. for 1 hour, then at 115° C. for 1 hour and then at 125° C. When the acid number of the polymer reached 50 (KOH mg/g), the reaction was stopped. Thus, a brown-colored particulate polymer dispersed in the continuous phase of ISOPAR-H was obtained, which was collected by filtration, washed with n-hexane and dried at 60° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. Main fraction of this particulate polyamide-imide polymer had a particle diameter of about 10–80 microns.

EXAMPLE 6

While introducing a nitrogen gas into the same apparatus as used in Example 5 (2), 57 g of trimellitic anhydride, 26 g of the dispersion stabilizer solution obtained in Example 5 (1) (nonvolatile content 50.5% by weight), 150 g of ISOPAR-H and 11 g of N-methylpyrrolidone were introduced into the apparatus and heated to 180° C. with powerful stirring. In this state, the mixture formed a continuous phase and a dispersed phase, and gave an emulsion. To the emulsion was dropped 75 g of liquid 4,4'-diphenylmethane diisocyanate over a period of 2 hours. Subsequently, the mixture was reacted at that temperature for 2 hours. Thus, a brown-colored particulate polymer dispersed in ISOPAR-H was obtained, which was collected by filtration, washed with n-hexane and dried at 60° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. This particulate polymer had a fraction insoluble in N-methylpyrrolidone, and its main fraction had a particle diameter of about 10–80 microns.

EXAMPLE 7

Synthesis of Dispersion Stabilizer

Into the same apparatus as used in Example 5 (1), 152 g of ISOPAR-H was introduced and heated to 120° C. While introducing nitrogen gas, a beforehand prepared mixture consisting of 183 g of lauryl methacrylate, 9 g of 2-hydroxyethyl methacrylate, 6 g of methacrylic acid and 10 g of benzoyl peroxide paste (benzoyl peroxide content 50% by weight) was dropped thereinto with stirring over a period of 2 hours. Subsequently, the mixture was heated to 140° C. and reacted at this temperature for 5 hours. When baked at 170° C. for 30 minutes, this dispersion stabilizer solution gave 50% by weight of non-volatile component. Number average molecular weight of this dispersion stabilizer was 15,000.

(2) Synthesis of Particulate Polymer Having Imide Groups

While passing nirogen gas through the same apparatus as used in Example 5 (2), 75 g of 4,4'-diphenylmethane diisocyanate, 19 g of the dispersion stabilizer solution obtained in (1) of this example (nonvolatile content 50% by weight), 150 g of ISOPAR-H and 33 g of γ-butyrolactone were introduced thereinto and heated to 90° C. with stirring. Then, 57 g of beforehand finely pulverized trimellitic anhydride was added, and the reaction was carried out at 100° C. for 1 hour, then at 120° C. for 1 hour, then at 140° C. for 1 hour and then at 180° C. When the acid number of the polymer reached 60 (KOH mg/g), the reaction was stopped. Thus, a yellow-colored particulate polymer dispersed in ISOPAR-H was obtained. It was recovered by filtration, washed with n-hexane and then dried at 60° C. for 5 hours under reduced pressure. Infrared absorption spectrum of this particulate polymer showed an absorption of imide bond at 1780 cm$^{-1}$ and absorption of amide bond at 1650 cm$^{-1}$ and 1540 cm$^{-1}$. Main fraction of this particulate polyamide-imide polymer had a particle diameter of about 10–80 microns.

EXAMPLE 8

While passing nitrogen gas through the same apparatus as used in Example 5 (2), 75 g of 4,4'-diphenylmethane diisocyanate, 26 g of the dispersion stabilizer solution obtained in Example 5 (1) (non-volatile content 50.5% by weight), 100 g of ISOPAR-H, 50 g of NISSEKIHISOL-150 (trade name of aromatic hydrocarbon manufactured by Nippon Sekiyu Kagaku K.K.) and 33 g of N-methylpyrrolidone were introduced thereinto and heated to 90° C. with stirring. In this state, the mixture gave a homogeneous solution. Then, 28 g of beforehand finely pulverized trimellitic anhydride and 48.6 g of 3,3', 4,4'-benzophenonetetracarboxylic acid dianhydride were added, and the reaction was proceeded at 100° C. for 1 hour and then at 115° C. for 1 hour. Just at this time, a solution of 13 g of the dispersion stabilizer solution obtained in Example 5 (1) (non-volatile content 50.5% by weight) in 13 g of ISOPAR-H was dropped thereinto over a period of 20 minutes. Subsequently, the temperature was elevated to 125° C. and the reaction was proceeded at this temperature. When the acid number of the polymer reached 30 (KOH mg/g), the reaction was stopped. Thus, a brown-colored particulate polymer dispersed in the continuous phase consisting of ISOPAR-H and NISSEKIHISOL-150 was obtained. It was collected by filtration, washed with n-hexane and then dried at 60° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. Main fraction of this particulate polyamide-imide polymer had a particle diameter of about 10–60 microns.

EXAMPLE 9

While passing nitrogen gas through the same apparatus as used in Example 5 (2), 75 g of 4,4'-diphenylmethane diisocyanate, 25 g of the dispersion stabilizer solution obtained in Example 7 (1) (non-volatile content 50% by weight), 120 g of ISOPAR-H, 33 g of N-methylpyrrolidone and 16 g of ε-caprolactam were introduced and heated to 90° C. with stirring. Then, 57 g of beforehand finely pulverized trimellitic anhydride was added, and the reaction was proceeded at 100° C. for 1 hour, then at 115° C. for 1 hour and then at 130° C. When the acid number of the polymer reached 70 (KOH mg/g), the reaction was stopped. Thus, a brown-colored particulate polymer dispersed in the continuous phase of ISOPAR-H was obtained. It was collected by filtration, washed with n-hexane and dried at 120° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. Main fraction of this particulate polyamide-imide polymer had a particle diameter of about 10–150 microns.

EXAMPLE 10

(1) Synthesis of Dispersion Stabilizer

In a four-necked flask equipped with a thermometer, a stirrer and a bulb type reflux condenser, 152 g of ISOPAR-H (trade name of aliphatic hydrocarbon manufactured by Esso Standard Oil Co.) was placed and heated to 120° C. While passing nitrogen gas, a beforehand prepared mixture consisting of 183 g of lauryl methacrylate, 17 g of 2-hydroxyethyl methacrylate and 10 g of benzoyl peroxide paste (benzoyl peroxide content 50% by weight) was dropped thereinto with stirring over a period of 2 hours. Subsequently, the temperature was elevated to 140° C., and the reaction was carried out at this temperature for 4 hours. When baked at 170° C. for 30 minutes, this dispersion stabilizer solution gave 50.5% by weight of non-volatile component. Number average molecular weight of the dispersion stabilizer was 14,000.

(2) Synthesis of Tolylene Diisocyanate Trimer

In a four-necked flask equipped with a thermometer, a stirrer and a bulb type reflux condenser, 1,000 g of tolylene diisocyanate, 0.52 g of anisic acid and 0.300 g of dimethylaminoethanol were placed and heated to 80° C. while passing nitrogen. The mixture was reacted at this temperature until the content of isocyanate group (initial concentration: 48% by weight) reached 32% by weight. Infrared spectrum of this product showed absorptions of isocyanurate ring at 1710 cm$^{-1}$ and 1410 cm$^{-1}$ and an absorption of isocyanate group at 2260 cm$^{-1}$.

(3) Synthesis of Particulate Gel Polymer Having Imide Groups

While passing a nitrogen gas through a four-necked flask equipped with a thermometer, a stirrer and a bulb type reflux condenser, 48.4 g of 4,4'-diphenylmethane diisocyanate, 48.4 g of the tolylene diisocyanate trimer obtained in (2) of this example, 19.0 g of dispersion stabilizer solution obtained in (1) of this example (non-volatile content 50.5% by weight), 150 g of ISOPAR-H (trade name of aliphatic hydrocarbon manufactured by Esso Standard Oil Co.) and 33 g of N-methyl-2-pyrrolidone were introduced thereinto and heated to 110° C. with stirring. Then, 37.2 g of beforehand finely pulverized trimellitic anhydride was added, and the reaction was carried out at 110° C. for 1 hour, at 120° C. for 1 hour, at 130° C. for 1 hour, at 140° C. for 1 hour, at 150° C. for 1 hour and then at 160° C. for 2 hours. A part of the brown-colored particulate polymer dispersed in ISOPAR-H was withdrawn with a pipette and added to N-methyl-2-pyrrolidone. As a result, the particulate polymer did not dissolve into N-methyl-2-pyrrolidone, and the N-methyl-2-pyrrolidone was not colored. Then, it was recovered by filtration, washed with n-hexane and then with acetone, and dried at 60° C. for 5 hours under reduced pressure. Infrared absorption spectrum of this particulate polymer showed an absorption of imide bond at 1780 cm$^{-1}$ and absorptions of amide bond at 1650 cm$^{-1}$ and 1540 cm$^{-1}$. When this particulate polymer was examined by means of a scanning electron microscope, it had a spherical shape and its main fraction had a particle diameter of about 10–80 μm. Its initial thermal decomposition temperature was 390° C. (conditions of measurement: temperature-elevating speed 10° C./min., air atmosphere, weight of sample 10 mg).

EXAMPLE 11

While passing a nitrogen gas through the same apparatus as used in Example 10 (3), 19.0 g of the dispersion stabilizer solution obtained in Example 10 (1) (non-volatile content 50.5%), 94.3 g of the tolylene diisocyanate trimer obtained in Example 10 (2), 150 g of ISO- PAR-H (trade name of aliphatic hydrocarbon manufactured by Esso Standard Oil Co.) and 33 g of N-methyl-2-pyrrolidone were introduced into the apparatus and heated to 110° C. with stirring. Then, 37.7 g of beforehand finely pulverized trimellitic anhydride was added, and reacted at 110° C. for 1 hour, at 120° C. for 1 hour, at 130° C. for 1 hour, at 140° C. for 1 hour, at 150° C. for 1 hour and then at 160° C. for 2 hours. After ascertaining the gelation of particulate polymer in the same manner as in Example 10, a brown-colored particulate polymer dispersed in ISOPAR-H was recovered by filtration, washed with n-hexane and then with acetone and then dried at 60° C. for 5 hours under reduced pressure.

Infrared absorption spectrum of this particulate polymer showed an absorption of imide bond at 1780 cm$^{-1}$ and absorptions of amide bond at 1650 cm$^{-1}$ and 1540 cm$^{-1}$. Examination of this particulate polymer by means of the scanning electron microscope revealed that it had a spherical shape and its main fraction had a particle diameter of about 10–80 microns. Its initial thermal decomposition temperature was 290° C., as measured under the following conditions: temperature elevating speed 10° C./min., air atmosphere, sample weight 10 mg.

EXAMPLE 12

While passing nitrogen gas through a four-necked flask equipped with a thermometer, a stirrer and a bulb type reflux condenser, 37.8 g of 4,4'-diphenylmethane diisocyanate, 36.2 g of tolylene diisocyanate trimer obtained in Example 10 (2), 19.0 g of dispersion stabilizer solution obtained in Example 10 (1) (non-volatile content 50.5% by weight), 150 g of ISOPAR-H trade name of aliphatic hydricarbon manufactured by Esso Standard Oil Co.) and 33 g of N-methyl-2-pyrrolidone were introduced into the apparatus and heated to 110° C. with stirring. Then, 58.0 g of beforehand finely pulverized trimellitic anhydride was added, and reacted at 110° C. for 1 hour, at 120° C. for 1 hour, at 130° C. for 1 hour, at 140° C. for 1 hour, at 150° C. for 1 hour, at 160° C. for 2 hours and then at 180° C. for 5 hours. After ascertaining the gelation of particulate polymer in the same manner as in Example 10, the brown-colored particulate polymer dispersed in ISOPAR-H was recovered by filtration, washed with n-hexane and then with acetone, and thereafter dried at 150° C. for 5 hours under reduced pressure.

Infrared absorption spectrum of this particulate polymer showed an absorption of imide bond at 1780 cm$^{-1}$ and absorptions of amide bond at 1650 cm$^{-1}$ and 1540 cm$^{-1}$. Examination of this particulate polymer by means of scanning electron microscope revealed that it had a spherical form and its main fraction had a particle diameter of about 10–80 microns.

EXAMPLE 13

While passing nitrogen gas through a four-necked flask equipped with a thermometer, a stirrer and a bulb type reflux condenser, 60.0 g of 4,4'-diphenylmethane diisocyanate, 14.4 g of tolylene diisocyanate trimer obtained in Example 10 (2), 19.0 g of the dispersion stabilizer solution obtained in Example 10 (1) (non-volatile content 50.5% by weight), 150 g of ISOPAR-H (trade name of aliphatic hydrocarbon manufactured by Esso Standard Oil Co.) and 33 g of N-methyl-2-pyrrolidone were introduced into the apparatus and heated to 110° C. with stirring. Then, 57.6 g of beforehand finely pulverized trimellitic anhydride was added, and reacted at 110° C. for 1 hour, at 120° C. for 1 hour, at 130° C. for 1 hour, at 140° C. for 1 hour, at 150° C. for 1 hour, at 160° C. for 2 hours and then at 180° C. for 5 hours. After ascertaining the gelation of particulate polymer in the same manner as in Example 10, a brown-colored particulate polymer dispersed in ISOPAR-H was recovered by filtration, washed with n-hexane and then with acetone, and thereafter dried at 150° C. for 5 hours under reduced pressure.

Infrared absorption spectrum of this particulate polymer showed an absorption of imide bond at 1780 cm$^{-1}$ and absorptions of amide bond at 1650 cm$^{-1}$ and 1540 cm$^{-1}$. Examination of this particulate polymer by means of scanning electron microscope revealed that it had a spherical shape and its main fraction had a particle diameter of about 10–80 microns.

EXAMPLE 14

While passing nitrogen gas through the same apparatus as used in Example 10 (3), 19.0 g of the dispersion stabilizer solution obtained in Example 10 (1) (non-volatile content 50.5% by weight), 146 g of 70% (by weight) solution of isophorone diisocyanate trimer (IPDI-T 1890 S; trade name of a product manufactured by Chemische Werke Huels AG) and 33 g of N-methyl-2-pyrrolidone were introduced into the apparatus and heated to 110° C. with stirring. Then, 30.0 g of beforehand finely pulverized trimellitic anhydride was added, and reacted at 110° C. for 1 hour, at 120° C., for 1 hour, at 130° C. for 1 hour, at 140° C. for 1 hour, at 150° C. for 1 hour and then at 160° C. for 2 hours. After ascertaining the gelation of particulate polymer in the same manner as in Example 10, a light brown-colored particulate polymer dispersed in ISOPAR-H was recovered by filtration, washed with n-hexane and then with acetone, and thereafter dried at 60° C. for 5 hours and under reduced pressure.

Infrared absorption spectrum of this particulate polymer showed an absorption of imide bond at 1780 cm$^{-1}$ and absorptions of amide bond at 1650 cm$^{-1}$ and 1540 cm$^{-1}$. This particulate polymer was not soluble in N-methyl-2-pyrrolidone at all. Examination of this particulate polymer by means of scanning electron microscope revealed that it had a spherical shape and its main fraction had a particle diameter of about 10–80 microns.

What is claimed is:

1. A process for producing a particulate polymer which may be in gelled state and has imide groups comprising reacting
   (I) a polyisocyanate,
   (II) a polycarboxylic acid having at least one acid anhydride group, and if necessary
   (III) a polycarboxylic acid other than the above-mentioned (II) in the presence of a liquid medium containing at least one non-aqueous organic liquid (A) in which the resulting particulate polymer having imide groups is substantially insoluble, and thereby obtaining a particulate polymer having imide groups dispersed in the non-aqueous organic liquid (A).

2. A process for producing a particulate polymer having imide groups which comprises reacting:
   (I) a polyisocyanate,
   (II) a polycarboxylic acid having at least one acid anhydride group, and if necessary,
   (III) a polycarboxylic acid other than (II), in the presence of a non-aqueous organic liquid (A) in which the resulting particulate polymer having imide groups is substantially insoluble, and thereby obtaining a particulate polymer having mide groups dispersed in (A).

3. A process for producing a particulate polymer having imide groups according to claim 2, wherein said polyisocyanate (I) is 4,4'-diphenylmethane diisocyanate, tolylene diisocyanate, xylylene diisocyanate or a polyisocyanate having isocyanurate ring.

4. A process for producing a particulate polymer having imide groups according to claim 2, wherein said polycarboxylic acid having acid anhydride group (II) is trimellitic anhydride, pyromellitic anhydride or 3,3', 4,4'-benzophenonetetracarboxylic acid dianhydride.

5. A process for producing a particulate polymer having imide groups according to claim 2, wherein said particulate polymer having imide groups is a particulate polyimide or a particulate polyamide-imide.

6. A process for producing a particulate polymer having imide groups which comprises reacting:
(I) a polyisocyanate,
(II) a polycarboxylic acid having at least one acid anhydride group, and if necessary,
(III) a polycarboxylic acid other than (II), in the presence of:
(A) a first non-aqueous organic liquid in which the resulting particulate polymer having imide groups is substantially insoluble,
(B) a dispersion stabilizer soluble in (A), and
(C) a second non-aqueous organic liquid which is substantially immiscible with (A) and in which the resulting particulate polymer having imide groups is soluble or swellable,
and thereby obtaining a particulate polymer having imide groups dispersed in (A).

7. A process for producing a particulate polymer having imide group according to claim 6, wherein said dispersion stabilizer is a hydroxyl group-containing vinyl polymer.

8. A process for producing a particulate polymer having imide groups according to claim 6, wherein said first non-aqueous organic liquid is an aliphatic or alicyclic hydrocarbon and said second non-aqueous organic liquid is N-methylpyrrolidone.

9. A process for producing a particulate polymer having imide groups according to claim 6, wherein said polyisocyanate (I) is 4,4'-diphenylmethane diisocyanate, 4,4'-diphenylether diisocyanate, tolylene diisocyanate or a polyisocyanate having isocyanurate ring.

10. A process for producing a particulate polymer having imide groups according to claim 6, wherein said polycarboxylic acid (II) having at least one acid anhydride group is trimellitic anhydride, pyromellitic dianhydride or 3,3', 4,4'-benzophenonetetracarboxylic acid dianhydride.

11. A process for producing a particulate gel polymer having imide groups which comprises reacting:
(I) a polyisocyanate having a functionality of 3 or higher, and if necessary combined with a bifunctional isocyanate,
(II) a polycarboxylic acid having at least one acid anhydride group, and if necessary,
(III) a polycarboxylic acid other than (II), in the presence of:
(A) a first non-aqueous organic liquid in which the resulting particulate polymer having imide groups is substantially insoluble,
(B) a dispersion stabilizer soluble in (A), and
(C) a second non-aqueous organic liquid which is substantially immiscible with (A) and in which the resulting particulate polymer having imide group is soluble or swellable,
until the resulting particulate polymer having imide groups becomes insoluble in (C), and thereby obtaining a particulate polymer having imide groups dispersed in (A).

12. A process for producing a particulate gel polymer having imide groups according to claim 11, wherein said first non-aqueous organic liquid is an aliphatic or alicyclic hydrocarbon and said second non-aqueous organic liquid is N-methyl-2-pyrrolidone.

13. A process for producing a particulate gel polymer having imide groups according to claim 11, wherein said polyisocyanate (I) is a trimer of diisocyanate.

14. A process for producing a particulate gel polymer having imide groups according to claim 11, wherein said bifunctional isocyanate is an aromatic diisocyanate.

15. A process for producing a particulate gel polymer having imide groups according to claim 11, wherein said polycarboxylic acid having at least one acid anhydride group (II) is trimellitic anhydride, pyromellitic dianhydride or 3,3', 4,4'-benzophenonetetracarboxylic acid dianhydride.

* * * * *